United States Patent [19]

McCormick

[11] Patent Number: 4,832,636
[45] Date of Patent: May 23, 1989

[54] MARINE DRIVE LOWER UNIT WITH SEQUENTIALLY LOADED MULTIPLE THRUST BEARINGS

[75] Inventor: Daniel F. McCormick, Oshkosh, Wis.

[73] Assignee: Brunswick Corporation, Skokie, Ill.

[21] Appl. No.: 162,181

[22] Filed: Feb. 29, 1988

[51] Int. Cl.⁴ .............................. B63H 23/02
[52] U.S. Cl. ..................... 440/80; 384/303; 384/304; 416/129; 440/83
[58] Field of Search .......... 440/75, 81, 83, 80; 74/665 K, 410; 416/128, 129 R, 129 A; 384/303, 304

[56] References Cited

U.S. PATENT DOCUMENTS

| | | | |
|---|---|---|---|
| 1,968,199 | 7/1934 | Greve | 384/303 |
| 2,630,775 | 3/1953 | Kiekhaefer | |
| 2,987,031 | 6/1961 | Odden | 440/81 |
| 3,158,415 | 11/1964 | Gardner | 384/304 |
| 4,112,866 | 9/1978 | Liaaen | 440/83 |
| 4,317,655 | 3/1982 | Schiek | 440/78 |
| 4,323,285 | 4/1982 | Gilson | 384/303 |

FOREIGN PATENT DOCUMENTS 3615 of 1912 United Kingdom .................. 440/83

*Primary Examiner*—Sherman D. Basinger
*Attorney, Agent, or Firm*—Andrus, Sceales, Starke & Sawall

[57] ABSTRACT

A marine drive unit (1) includes a lower torpedo housing (9). At least one propeller shaft (21) is mounted in the housing for rotation about a drive axis (17). The propeller shaft is driven by a driving gear (16) suitably connected to a marine engine (4) and mounted on the drive axis. A first forward thrust bearing (41) is disposed between the driving gear and the housing. In addition, a second forward thrust bearing (42) is disposed adjacent the forward end of the propeller shaft. A pre-loading device, in the present embodiment a washer-like Belleville spring (43) of a desired capacity, is disposed to provide an adjustable rearwardly biasing force on the second thrust bearing.

9 Claims, 1 Drawing Sheet

MARINE DRIVE LOWER UNIT WITH SEQUENTIALLY LOADED MULTIPLE THRUST BEARINGS

BACKGROUND AND SUMMARY OF THE INVENTION

This invention relates broadly to the loading of thrust bearings and more particularly to a marine drive lower unit with sequentially loaded multiple thrust bearings.

Marine drives normally include an outboard positioned drive unit which includes a gear case for mounting a vertical main drive shaft connected at its upper end to a source of power, such as a marine engine. The lower portion of the drive shaft passes through a lower gear case portion which, in turn, is constructed in a manner to provide a generally horizontal torpedo housing. The housing serves to mount one or more propeller shafts which are driven by the main drive shaft and which drivingly rotate one or more marine propellers which are disposed generally aft of the gear case.

Heretofore, and in the case of a single propeller shaft, a pinion gear disposed on the lower end of the main drive shaft and within the housing has drivingly meshed with a driving gear mounted to the propeller shaft. In addition to the utilization of one or more reverse thrust bearings, a forward thrust bearing has been disposed between the driving gear and the housing to receive and carry the entire foward thrust on the propeller shaft caused by rotation of the propeller in a forward driving direction. Due to the major forces involved during forward driving, this thrust bearing has necessarily been of relatively high capacity, and thus of large diameter.

It is desirable to construct the torpedo housing to be of minimal diameter to thereby reduce drag as well as manufacturing costs. The previously known relatively large foward thrust bearing did not help in this regard.

It is an object of the present invention to provide a forward thrust bearing arrangement for a drive unit having one or more propeller shafts which enables a reduction in the diameter of the torpedo housing. It is a further object of the invention to provide an arrangement wherein a forward thrust bearing of large size is not required.

In accordance with the broad aspects of the invention, the thrust load on a shaft to be carried by two bearings is divided, utilizing a pre-load on one of the bearings. More particularly, and in the embodiment illustrated herein, a marine drive unit includes a lower torpedo housing. At least one propeller shaft is mounted in the housing for rotation about a drive axis. The propeller shaft is driven by a driving gear suitably connected to a marine engine and mounted on the drive axis. A first forward thrust bearing is disposed between the driving gear and the housing. In addition, a second forward thrust bearing is disposed adjacent the forward end of the propeller shaft. A pre-loading device, in the present embodiment a washer-like Belleville spring of a desired capacity, is disposed to provide an adjustable rearwardly biasing force on the second thrust bearing.

The construction is such that, when the drive unit is at rest, the second thrust bearing is adjustably preloaded and the first thrust bearing is free of load. As the drive unit is activated to rotate the propeller in a forward driving direction, the preliminary forward thrust carried through the propeller shaft is carried substantially exclusively by the second thrust bearing, until, and as the thrust increases, the pre-loading device finally permits the first thrust bearing to take the balance of the load. The result, after the sequential thrust take-up action, is to ultimately split the load between the thrust bearings, which therefore may each be of lower capacity and diameter.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
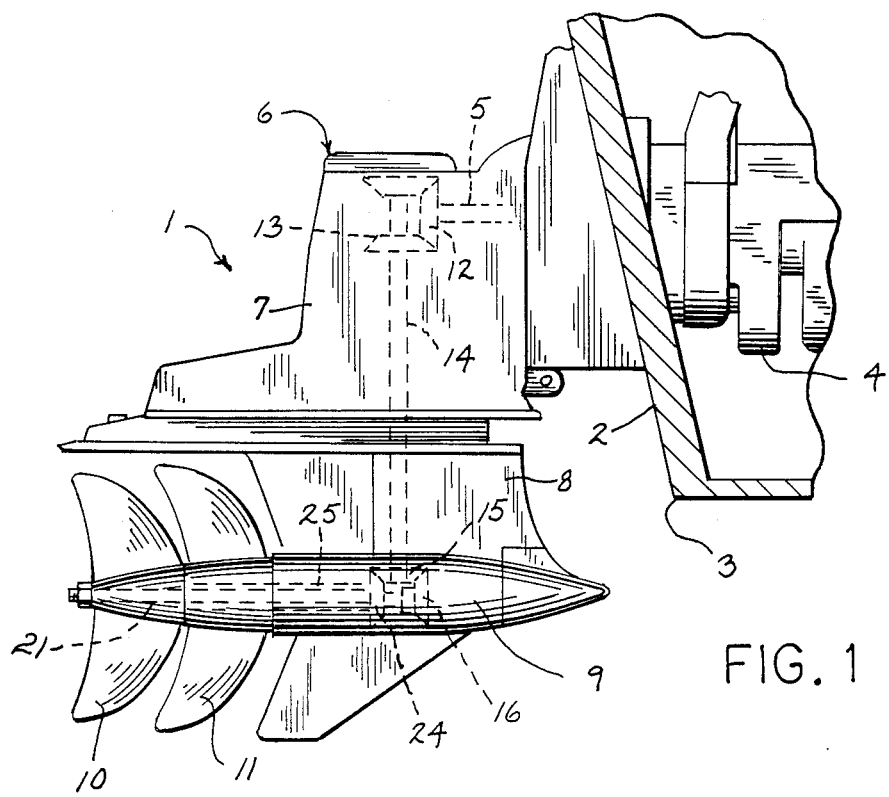
FIG. 1 is a schematic side elevational view of a marine stern drive unit which incorporates the various aspects of the invention.

As best shown in FIG. 1 of the drawings, and in the present embodiment, the various aspects of the invention are utilized in a marine stern drive unit 1 adapted to be suitably mounted to the transom 2 of a boat 3. An internal combustion engine 4 is disposed within the boat and includes an output with a shaft 5 which extends through transom 2 to unit 1, in the usual manner.

Stern drive unit 1 generally includes a stern drive housing 6 forming an upper gear case 7, a lower gear case 8 suitably mounted to gear case 7, and a generally horizontally fore-to-aft extending frame-like torpedo housing 9 disposed at the bottom of gear case 8. A pair of coaxially mounted propellers 10 and 11 are mounted for rotation generally aft of housing 9. For purposes of driving propellers 10 and 11, a pinion 12 is disposed on the outer end of shaft 5 and meshes with a gear 13 mounted to the upper end of a vertical main drive shaft 14 within upper gear case 7. Main drive shaft 14 extends downwardly and through lower gear case 8, and is provided with a pinion 15 on its lower end. Pinion 15 meshes with a forwardly disposed rearwardly facing driving gear 16 mounted for rotation about a horizontal drive axis 17. Gear 16 includes an annular toothed gear body 18 having a forwardly disposed surface 19, with body 18 merging into a forwardly extending sleeve 20. Gear 16 is splined or otherwise mounted on and for rotation with a central axial longitudinally extending first propeller shaft 21. (See FIG. 2) Gear body 18 is also provided with an annular rear face 22 which is normally in engaging relationship with a forwardly facing shoulder 23 on propeller shaft 21.

Furthermore, pinion 15 meshes with a rearwardly disposed forwardly facing driving gear 24 which is also mounted for rotation about drive axis 17. As shown, gear 24 forms the forward end portion of a longitudinally extending second propeller shaft 25 and includes an annular toothed gear body 26 having a rearwardly disposed surface 27. Second propeller shaft 25 is generally tubular and concentric with shaft 21.

As schematically shown in FIG. 1, rear propeller 10 is mounted to the rearward end of central first propeller shaft 21, while front propeller 11 is mounted to the rearward end of second propeller shaft 25, in any suitable well known manner. The result in this instance is to provide contra-rotating propellers.

Forward gear 16 and propeller shaft 21 are supported for rotation in housing 9 by suitable support bearings 28, while rearward gear 24 and propeller shaft 25 are likewise supported by support bearings 29 and 30.

An annular bearing adapter 31 is disposed at the forward end portion of gear 16 and comprises an enlarged body 32 having a radially outwardly extending annular collar 33, for purposes to be described. Body 32 merges rearwardly into a sleeve portion 34 of reduced diameter which is concentrically and slidingly disposed between sleeve 20 of gear 16 and propeller shaft 21. A nut 35 is threadably mounted to the forward end of propeller shaft 21 and serves to clamp adapter body 32 against the abutment formed by the forward terminus 36 of sleeve 20. Thus, gear 16 and adapter 31 will rotate together.

It is contemplated that forward thrust is fully carried by a central element of the system. In other embodiments, such as wherein only a single propeller shaft and propeller are utilized, there is only one propeller shaft to carry the thrust. In the present embodiment, the geometry and placement of the elements is such that any forward thrust on outer propeller shaft 25 is transmitted to and carried by the body 32. The results are therefore the same whether a single or dual shafts are used. As shown, the thrust path is through an intermediate member 37a and associated bearings as described more fully in the present inventor's co-pending U.S. patent application Ser. No. 07/162,191 entitled "Marine Drive Lower Unit with Thrust Bearing Rotation Control", filed on even date herewith and now U.S. Pat. No. 4,795,382.

Figure 2:
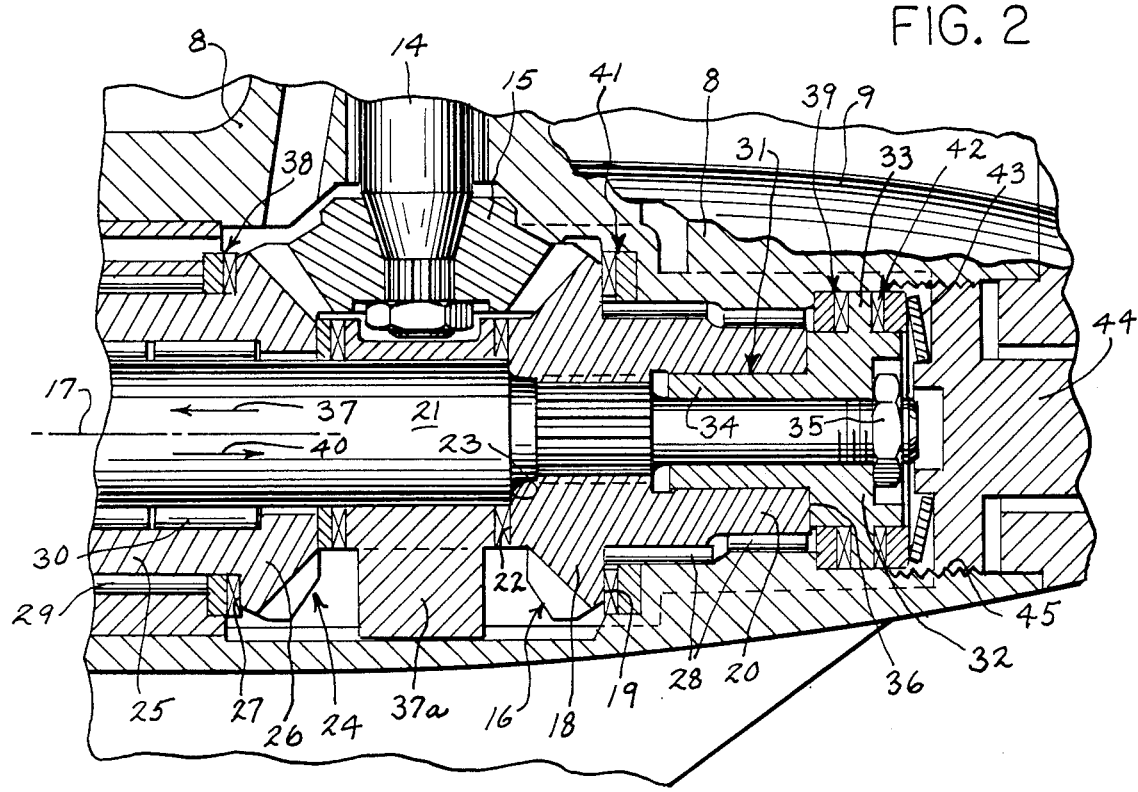
FIG. 2 is an enlarged fragmentary vertical generally sectional view of an intermediate portion of the forward propeller shaft mounting.

As is known, and in the present embodiment, outer shaft 25 reverse thrust as illustrated by the arrow 37 is carried by reverse thrust bearing means. As shown in FIG. 2, an annular ring-like roller-type thrust bearing assembly 38 is confined between surface 27 of driving gear 24 and a portion of gear case 8. Likewise, a similar thrust bearing assembly 39 is confined between the rearward side of bearing adapter collar 33 and a portion of the gear case. Reverse thrust forces 37 on shaft 21 are transmitted to bearing assembly 39 and reverse thrust on shaft 25 is transmitted to bearing assembly 38.

In addition, forward thrust bearing means are provided to carry the forward thrust forces, illustrated by the arrow 40, on shaft 21. For this purpose, a thrust bearing assembly 41 of generally similar type is confined between surface 19 of driving gear 16 and a portion of gear case 8. Forward thrust in the direction of arrow 40 is transmitted from propeller shaft 21 and through shoulder 23 to rearward gear surface 22 of gear 16, and hence from forward gear surface 19 to bearing assembly 41.

Bearing assembly 41 has previously been the sole receiver of forward thrust forces, creating the disadvantages discussed heretofore.

In accordance with the various aspects of the invention, and in the present embodiment, a supplemental and pre-loaded forward thrust bearing means is provided which functions sequentially with bearing assembly 41 and, in effect, adds to the latter's capacity in a thrust-force-splitting manner. For this purpose, a second forward thrust bearing assembly 42 is provided at the forward end of bearing adapter 31 and at the front face of collar 33, opposite from bearing assembly 39. This second forward thrust bearing assembly 42 is biasingly pre-loaded rearwardly and in a direction toward bearing assembly 41 by a spring means comprising, in this instance, a rearwardly disposed washer-like Belleville spring 43. Spring 43 is confined between bearing assembly 42 and an adjustable plug-like element 44 threadably mounted to gear case 8, as at 45. By providing a spring 43 of desired strength and by suitably axially adjusting element 44, the desired amount of pre-load can be obtained.

When propellers 10 and 11 are at rest, the pre-load effect of Belleville spring 43 places a rearward biasing force on bearing assembly 42, which in turn biases bearing adapter 31 and its clampingly associated gear 16 rearwardly. This tends to separate gear surface 19 rearwardly from the first bearing assembly 41 so that the latter is essentially free of load. As propellers 10 and 11 start to acceleratingly rotate in a forward driving direction, the initial forward thrust is carried by propeller shaft 21 to bearing assembly 42 and Belleville spring 43. However, bearing assembly 41 remains unloaded until the forward thrust forces reach and exceed the pre-load forces at bearing assembly 42 caused by the spring. As the propellers acceleratingly increase in speed and the forward thrust likewise increases further, and when the pre-load forces are finally exceeded, bearing assembly 41 then begins to take up the additional load. The total maximum thrust load is split between bearing assemblies 41 and 42 in an additive manner, and finally a balance is ultimately achieved at the point of maximum thrust.

Deceleration of the propellers causes a reversal of the above-described sequential action.

By providing a plurality of sequentially operative forward thrust bearing assemblies, based on a pre-load of one of them, each assembly may be of a lower capacity and size.

Various modes of carrying out the invention are contemplated as being within the scope of the following claims which particularly point out and distinctly claim the subject matter regarded as the invention.

I claim:
1. In a marine drive, the combination comprising:
   (a) a generally vertical gear casing (7, 8) terminating in a lower generally horizontal fore-to-aft extending housing (9),
   (b) a propeller shaft (21) disposed within said housing for rotation about a longitudinal drive axis (17),
   (c) a propeller (10) connected to said propeller shaft at a rearward end of the latter,
   (d) drive means for connecting said propeller shaft to a marine engine and with said drive means including a rearwardly-facing drive gear (16) secured for rotation with said propeller shaft,
   (e) first forward thrust bearing means (41) confined between said gear and said housing,
   (f) second forward thrust bearing means (42) mounted in connected relationship to and adjacent a forward end portion of said gear and spaced forwardly of said first bearing means,
   (g) and biasing means (43) for pre-loading said second thrust bearing means in a rearward direction toward said first thrust bearing means.

2. The combination of claim 1 wherein said biasing means (43) comprises means associated with said drive gear (16) to unload said first forward thrust bearing means (41) when said propeller (10) is at rest.

3. The combination of claim 2 wherein the construction is such that:
   (a) as said propeller shaft (21) and said propeller (10) initially accelerate, the initial forward thrust created thereby is carried by said shaft solely to said second forward thrust bearing means (42) with said first bearing means (41) remaining unloaded, (b) and as said propeller shaft and said propeller accelerate further so that the force of forward thrust carried by said shaft exceeds the preloading force of said biasing means on said second forward thrust bearing means, said forward thrust force additionally loads said first bearing means.

4. The combination of claim 3 which includes:
(a) a second propeller shaft (25) disposed within said housing (9) for rotation about said axis (17), said second propeller shaft being concentric with said first-named propeller shaft (21),
(b) a second propeller (11) connected to said second propeller shaft,
(c) said drive means being adapted to connect said second propeller shaft to a marine engine and with said drive means further including a forwardly facing drive gear (24) on said second propeller shaft,
(d) first reverse thrust bearing means (38) confined rearwardly of said forwardly facing drive gear (24) between the latter and said gear case (8),
(e) and second reverse thrust bearing means (39) disposed between said gear case and said preloaded second forward thrust bearing means (42).

5. The combination of claim 1, 2, 3 or 4:
(a) which includes:
(1) a bearing adapter (31) mounted for rotation with said rearwardly facing drive gear (16) and carrying said second forward thrust bearing means (42),
(2) and an axially adjustable element (44) disposed forwardly of said adapter,
(b) said biasing means (43) being confined between said second forward thrust bearing means (42) and said element so that said second forward thrust bearing means is pre-loaded.

6. The combination of claim 1, 2, 3 or 4 wherein said biasing means comprises a Belleville spring (43).

7. In a rotary drive, the combination comprising:
(a) a frame (9),
(b) a shaft (21) disposed within said frame for rotation about a longitudinal axis (17), and with said shaft having a forward and rearward end and being adapted to carry forward thrust,
(c) an annular member (16) secured for rotation with said shaft,
(d) first forward thrust bearing means (41) confined between said member and said frame,
(e) second forward thrust bearing means (42) mounted in connected relationship to and adjacent a forward end portion of said member and spaced forwardly of said first bearing means,
(f) and biasing means (43) for pre-loading said second thrust bearing means in a rearward direction toward said first thrust bearing means to sequentially divide the forward thrust between said first and second bearing means.

8. The combination of claim 7:
(a) which includes:
(1) a bearing adapter (31) mounted for rotation with said member (16) and carrying said second forward thrust bearing means (42),
(2) and an auxiliary adjustable element (44) disposed forwardly of said adapter,
(b) said biasing means (43) being confined between said second forward thrust bearing means (42) and said element so that said second forward thrust bearing means is pre-loaded.

9. The combination of claim 7 or 8 wherein said biasing means comprises a Belleville spring (43).

* * * * *